US008496808B2

(12) United States Patent
Kinasewich et al.

(10) Patent No.: US 8,496,808 B2
(45) Date of Patent: Jul. 30, 2013

(54) WASTEWATER TREATMENT APPARATUS

(75) Inventors: Harold Kinasewich, Edmonton, CA (US); Chris Kinasewich, Edmonton, CA (US)

(73) Assignee: Seair Inc, Edmonton (CA)

( * ) Notice: Subject to any disclaimer, the term of this patent is extended or adjusted under 35 U.S.C. 154(b) by 706 days.

(21) Appl. No.: 12/531,680

(22) PCT Filed: Mar. 16, 2007

(86) PCT No.: PCT/CA2007/000435
§ 371 (c)(1),
(2), (4) Date: Sep. 16, 2009

(87) PCT Pub. No.: WO2008/113150
PCT Pub. Date: Sep. 25, 2008

(65) Prior Publication Data
US 2010/0096305 A1      Apr. 22, 2010

(51) Int. Cl.
*B01D 35/00*      (2006.01)

(52) U.S. Cl.
USPC ............. 210/86; 210/138; 210/143; 210/151; 210/195.1

(58) Field of Classification Search
None
See application file for complete search history.

(56) References Cited

U.S. PATENT DOCUMENTS

| | | | | |
|---|---|---|---|---|
| 4,145,279 A | * | 3/1979 | Selby, III | 210/614 |
| 4,256,574 A | * | 3/1981 | Bhargava | 210/614 |
| 4,504,388 A | | 3/1985 | Desbos | |
| 6,464,875 B1 | * | 10/2002 | Woodruff | 210/603 |
| 6,569,338 B1 | | 5/2003 | Ozyboyd | |
| 6,740,245 B2 | | 5/2004 | Johnson | |
| 6,869,540 B2 | | 3/2005 | Robinson | |
| 6,923,901 B2 | | 8/2005 | Leffler | |
| 7,137,620 B2 | | 11/2006 | Thomas | |
| 7,273,562 B2 | | 9/2007 | Robinson | |
| 7,381,338 B2 | | 6/2008 | van Leeuwen | |
| 7,402,253 B2 | | 7/2008 | van Leeuwen | |
| 2004/0099607 A1 | | 5/2004 | Leffler | |
| 2008/0314807 A1 | * | 12/2008 | Junghanns et al. | 210/85 |

FOREIGN PATENT DOCUMENTS

| | | |
|---|---|---|
| JP | 2000189981 A | 7/2000 |
| KR | 1020060104476 A | 10/2006 |
| WO | 2005049502 A1 | 6/2005 |
| WO | 2005/061388 A1 | 7/2005 |

OTHER PUBLICATIONS

International Search Report, mailed Dec. 12, 2007, issued in corresponding International Application No. PCT/CA2007/000435, filed Mar. 16, 2007.
International Preliminary Report on Patentability, mailed Jun. 8, 2009, issued in corresponding International Application No. PCT/CA2007/000435, filed Mar. 16, 2007.

* cited by examiner

*Primary Examiner* — Dirk Bass
(74) *Attorney, Agent, or Firm* — Christensen O'Connor Johnson Kindness PLLC

(57) ABSTRACT

A wastewater treatment apparatus (10) includes one or more treatment tanks (12, 14). Each treatment tank (12, 14) has an associated oxygenation treatment circuit (18) including a gas and liquid mixing chamber (20), a gas injector (22) upstream of the mixing chamber (20) and one of an oxygen generator (24) or an ozone generator (26) supplying gas to the gas injector (22), and a pump (28, 29) for pumping wastewater from the treatment tank (12, 14) through the mixing chamber (20) and back to the treatment tank (28, 29).

13 Claims, 2 Drawing Sheets

WASTEWATER TREATMENT APPARATUS

FIELD

The present application relates to a wastewater treatment apparatus.

BACKGROUND

One method of wastewater treatment involves transferring wastewater to a settling tank, where contaminants settle over time. As the settling tank becomes filled, a float triggers the operation of a pump which pumps water from the top of the settling tank for disposal; typically into a discharge field. It usually takes a number of days to treat wastewater by this method. For example, treatment of sewage to irrigation quality discharge may take 10 to 14 days. The throughput of such wastewater treatment apparatus is determined by the size of settling tank. There is a need for a wastewater treatment apparatus that is able to process wastewater more rapidly to achieve increased throughput over time without increasing the size of the settling tank.

SUMMARY

There is provided a wastewater treatment apparatus which includes one or more treatment tanks. Each treatment tank has an associated treatment circuit including a gas and liquid mixing chamber, a gas injector upstream of the mixing chamber and at least one of a source of oxygen or a source of ozone supplying gas to the gas injector, and a pump for pumping wastewater from the treatment tank through the mixing chamber and back to the treatment tank.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
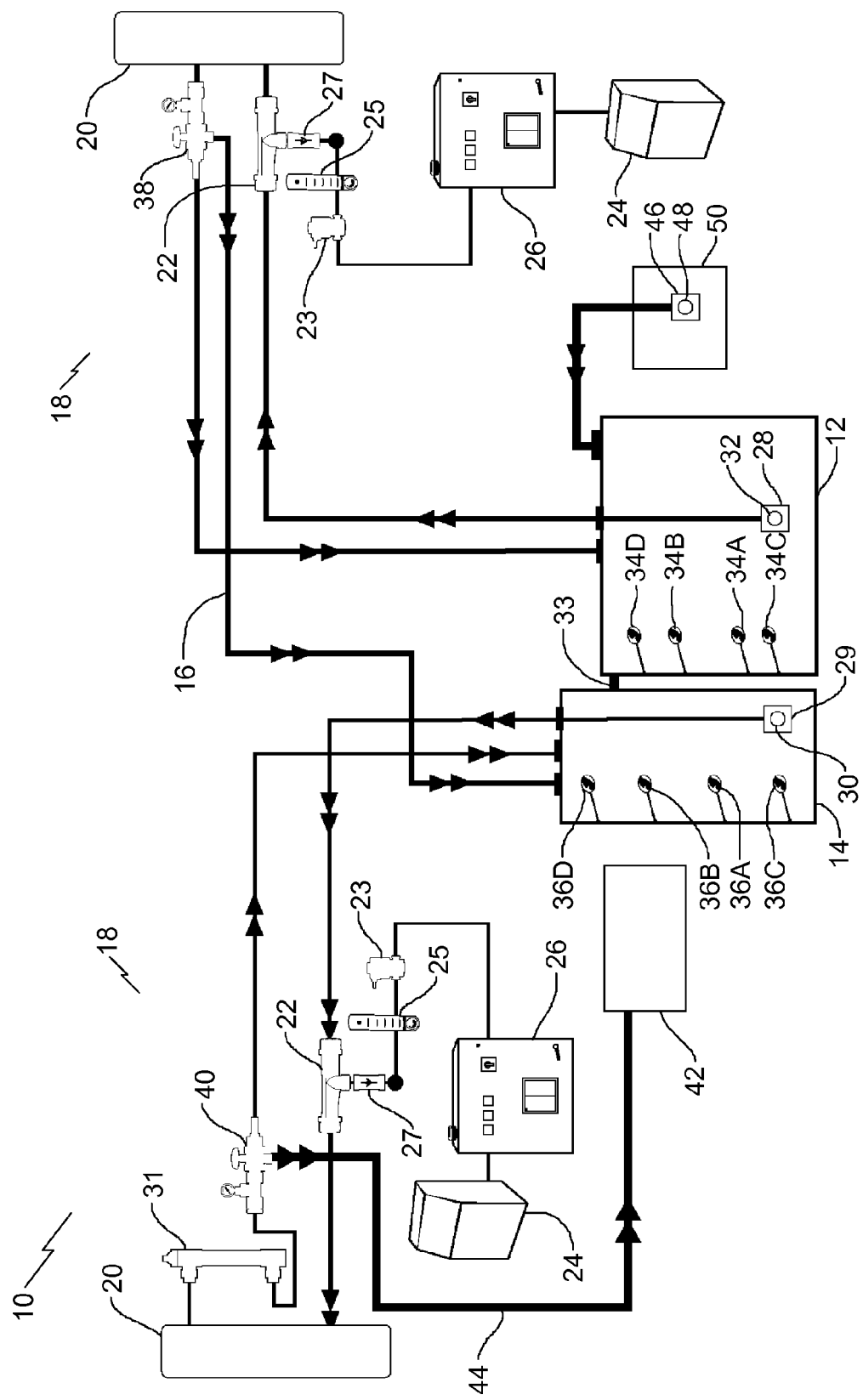
FIG. 1 is a schematic view of a wastewater treatment apparatus

A wastewater treatment apparatus generally identified by reference numeral 10, will now be described with reference to FIG. 1.

Structure and Relationship of Parts:

Referring to FIG. 1, wastewater treatment apparatus 10 has a primary treatment tank 12, a polishing treatment tank 14, and a transfer conduit 16 for transferring wastewater from primary treatment tank 12 to polishing treatment tank 14. Each treatment tank 12 and 14 has an associated treatment circuit generally indicated by reference numeral 18. Each treatment circuit 18 includes a gas and liquid diffusion mixing chamber 20 and a gas injector 22 that is positioned upstream of mixing chamber 20. A source of oxygen, such as an oxygen generator 24 or a supply of liquid oxygen, and a source of ozone, which may be an ozone generator 26 are connected to supply oxygen and ozone to gas injector 22, although only one or the other may be included for either circuit 18. Other components may be included, such as a gas control valve 23 and a flow meter 25 to monitor and control the flow of gas into gas injector 22, as well as a check valve 27 to prevent wastewater from entering the lines leading to generators 24 and 26. Circuit 18 also includes a pump 28 or 29 for pumping wastewater from each treatment tank 12 and 14, respectively, through mixing chamber 20, and, during the oxygenation/ozonation mode of operation, back to the respective treatment tank 12 and 14. Pumps 28 and 29 have an associated grinder 30 and 32 to reduce the particulate size of matter passing through pump 28. Another option is to include an ultraviolet treatment chamber 31 connected to the outlet of mixing chamber 20 to further treat the wastewater, as shown on circuit 18 associated with polishing treatment tank 14. Polishing treatment tank 14 and primary treatment tank 12 are also connected by an overflow line 33 in case a pump should fail. In addition, an overflow pump (not shown) may also be included to transfer wastewater out of, e.g. primary treatment tank 12 to prevent spills or unnecessary contamination.

There are multiple floats to determine the level of wastewater within each treatment tank 12 and 14 in order to set maximum and minimum wastewater levels within each tank 12 and 14, and to initiate the transfer of wastewater. The floats are identified as 34A, 34B, 34C and 34D in primary treatment tank 12, and 36A, 36B, 36C and 36D in secondary treatment tank 14. The various floats may be coupled to valves 38 and 40, which are three-way valves, as necessary. The coupling may be electrical, mechanical, or otherwise, as in known in instrumentation. Valves 38 and 40 are used to switch the operation of circuits 18 between aeration mode and transfer mode. When floats 34A and 36A are met, the treatment circuit 18 is activated. Float 34C in series with 36C signals tank 14 to empty by causing valve 40 to redirect the wastewater from tank 14 to a discharge field 42 via transfer conduit 44, assuming the wastewater level is at or above float 36C. Float 34D acts as a transfer level, and signals valve 38 to redirect wastewater from tank 12 to tank 14 until the wastewater level is at or above float 36D or until the wastewater level is below float 34A. Floats 34B and 36B act as alarm levels, such that, when these levels are reached, steps such as activating an overflow pump (not shown) may be taken. Floats 34A and 36A deactivate pumps 28 and 30 if wastewater levels drop below these floats. An additional pump 46 and grinder 48 in a lift station 50 transfers wastewater into primary treatment tank 12 to begin the treatment process.

Operation:

Referring to FIG. 1, the description of the process will begin assuming that primary treatment tank 12 and polishing treatment tank 14 are filled or nearly filled with wastewater. As the wastewater is continuously cycled through the associated treatment circuit 18, ozone or oxygen or both generated by oxygen generator 24 and ozone generator 26 are injected into the wastewater using gas injector 22. The wastewater and gas mixture are then circulated through gas and liquid diffusion mixing chamber 20, and back to the respective treatment tank 12 or 14. Once transfer level float 34C in primary treatment tank 12 is reached in series with float 36C in polishing treatment tank 14, valve 40 redirects flow coming from mixing chamber 20 through transfer conduit 44 to discharge field 42, such that polishing treatment tank 14 is emptied. Once minimum level float 36A in polishing treatment tank 14 is reached, valve 40 again redirects flow to polishing treatment tank 14, and valve 38 redirects flow to polishing tank 14 via transfer conduit 16 until the transfer liquid level is reached in polishing tank 14 as determined by float 36D, or until the minimum liquid level is reached in primary treatment tank 12 as determined by float 34A. Once this occurs, valve 38 again directs the flow of wastewater to primary treatment tank 12. Pump 46 associated with lift station 50 may be controlled in response to the floats in primary treatment tank 12, or more likely, to external demands, such as the production of wastewater. After a period of time in polishing tank 14, the effluent is treated and suitable for discharge. As shown, treatment tanks 12 and 14 have multiple floats, which may be used to allow for a more complicated set of operation rules to adapt to different situations, as will be understood by those skilled in the art. In addition, timers with adjustable set points, or an electronic automated system, such as a PLC (programmable logic controller), or both (not shown) may also be included in order to advance wastewater, such as in anticipation of expected peak flow conditions.

Figure 2:
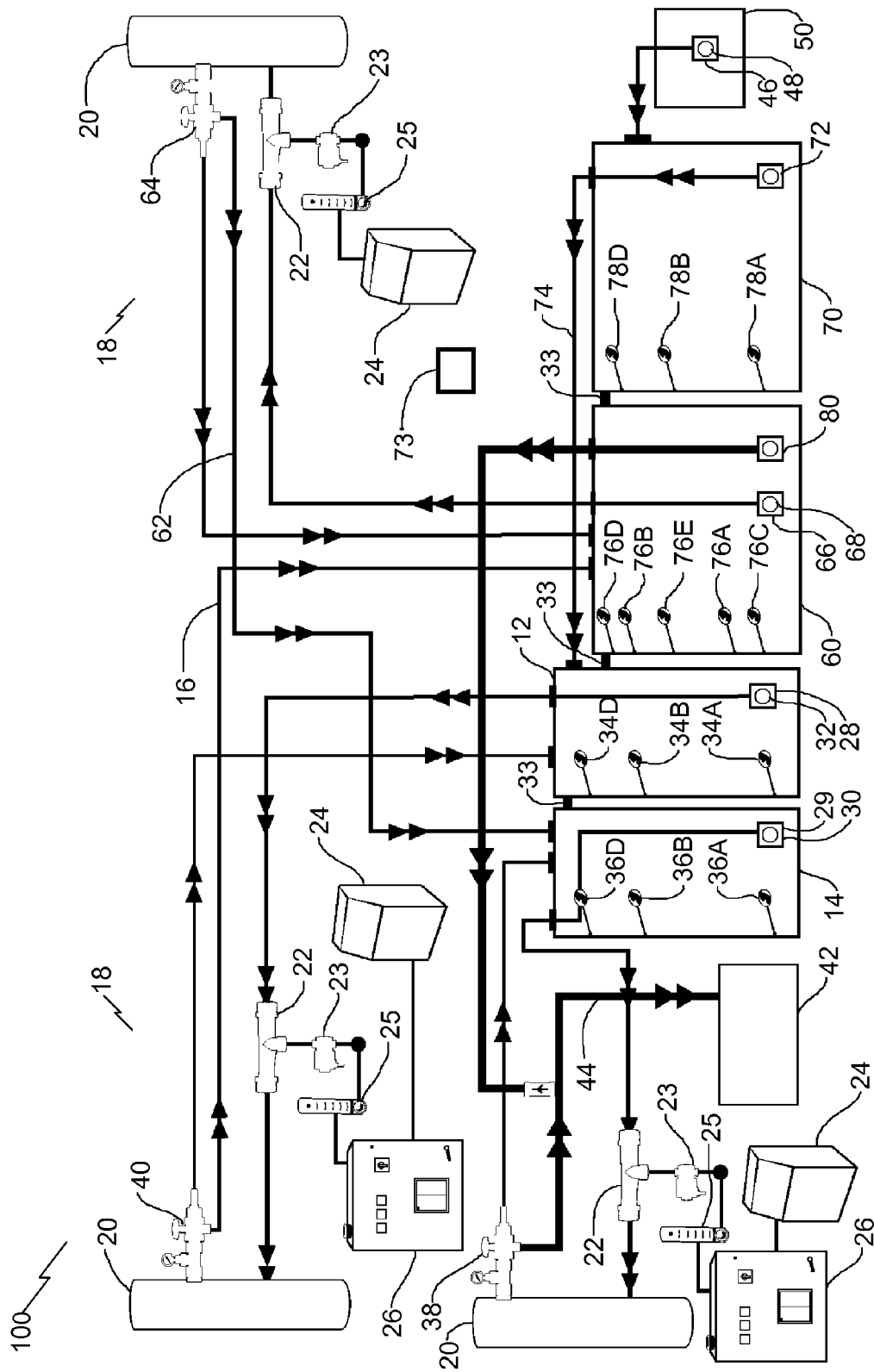
FIG. 2 is a schematic view of a variation of the wastewater treatment apparatus of FIG. 1.

Variations:

It will be understood that additional elements may be removed or included with respect to the embodiment described above. FIG. 2 shows an example of a wastewater system indicated generally by the reference numeral 100, in which additional elements have been included. As many of the elements are similar to FIG. 1, similar reference numerals have been used for clarity. In addition to primary treatment tank 12 and polishing treatment tank 14, wastewater treatment apparatus 100 has a clarifier treatment tank 60 and an additional transfer conduit 62. Transfer conduits 16 and 62 are used to transfer wastewater sequentially from primary treatment tank 12 to clarifier treatment tank 60, and then to polishing treatment tank 14. Clarifier treatment tank 60 also has an associated treatment circuit 18 similar to that described above with an associated three-way valve 64, a pump 66 and grinder 68. A holding tank 70 for holding wastewater may also be included that has a pump 72 and a feed conduit connection 74 to primary treatment tank 12. Primary treatment tank 12 and polishing tank 14 have level indicator floats 34A, 34B, 34D and 36A, 36B, 36D, respectively. As there are only three floats in tanks 12 and 14, floats 34A and 36A serve both to indicate the minimum level, and to activate the associated treatment circuit 18. Floats 34B and 36B act as alarm level indicators. Clarifier treatment tank 60 and holding tank 64 also include level indicator floats for determining a level of wastewater each tank. Clarifier treatment tank has a minimum level float 76A that sets a minimum liquid level, a transfer level float 76E that sets a transfer liquid level, and may include other floats 76C to indicate the circulation level, float 76B to act as an alarm level indicator, and float 76D, which is used to begin pumping wastewater from polishing tank 14 before the transfer level as indicated by float 76E is reached, since pumping to a discharge field may take longer than pumping from one tank to another. Holding tank 70 has level floats 78A, 78B and 78D for setting a minimum liquid level, a transfer liquid level, and an alarm level, respectively. Float 78A also serves to indicate the circulation level required for pump 72 to operate. In this embodiment, it is preferred to use a timer 73 (or more than one) to transfer wastewater from tanks 12, 14 and 70 to the next stage. In that situation, floats 34D, 36D and 78D act as backup valves and signal the respective valves 38, 40 and 64 to transfer wastewater from the next tank to the next stage, and also to transfer wastewater from the present tank to the next tank. For example, if the wastewater level reached float 34D before timer 73 initiated the necessary transfers, float 34D would cause valve 64 to redirect wastewater to tank 14, and at the same time cause valve 40 to redirect wastewater to tank 60. Preferably, however, timer 73 would cause this transfer to occur without floats 34D, 36D, 78D being reached.

The various floats described above are coupled to valves 38, 40, 64, and pump 72 either mechanically, electrically or otherwise, to control the transfer of wastewater through the treatment cycle. In the case of pumps 28, 29 and 66, the valves assume positions such that continued operation of pump 29 associated with polishing treatment tank 14 transfers wastewater from polishing treatment tank 14 to discharge field 42 when a predetermined fluid level is reached within clarifier treatment tank 60 as indicated by transfer level float 76E. Similarly, continued operation of pump 66 associated with clarifier treatment tank 60 transfers wastewater from clarifier treatment tank 60 via transfer conduits 62 to polishing treatment tank 14. Similarly, continued operation of pump 28 associated with primary treatment tank 12 transfers wastewater from primary treatment tank 12 via one transfer conduits 16 to clarifier treatment tank 60 for secondary treatment. When indicated by minimum level float 34A in primary treatment tank 12, pump 72 associated with holding tank 70 transfers wastewater via feed conduit 74 to primary treatment tank 12 to begin primary treatment. A discharge pump 80 is shown that, in case of emergency such as the failure of a pump, empties clarifier tank 70 to discharge field 42 in order to make room for wastewater form other tanks through overflow lines 33. It will be understood that the operation of pumps 28, 29 and 66 may or may not be continuous, however, it is possible that they run continuously as it is the position of valves 38, 40 and 64 that determine whether the tanks are emptied, filled, or the wastewater circulates through the various treatment circuits 18.

The operation of the example shown in FIG. 2 follows similar principles to those apparent with the operation of the example in FIG. 1, where a subsequent tank is emptied either to another tank or ultimately discharge field 42 to make room for wastewater from another tank that ready to be emptied. This is done through the operation of valves 38, 40, 64, and pump 72 in response to the various floats. The response of the system to the signals from the floats, timers, a PLC, or combinations of such may be varied by those skilled in the art to be responsive to different situations that may arise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A wastewater treatment apparatus (10), comprising:
   a primary treatment tank (12); and
   a polishing treatment tank (14),
   wherein wastewater is transferred sequentially from the primary treatment tank (12) to the polishing tank (14), and
   wherein each treatment tank (12, 14) has a separate associated treatment circuit (18) including:
      a gas and liquid mixing chamber (20) housed in a different vessel than the primary treatment tank or the polishing tank;
      an inflow conduit from the primary treatment tank or the polishing tank to the mixing chamber;
      a gas injector (22) on the inflow conduit upstream of the mixing chamber (20) and at least one of a source of oxygen (24) or a source of ozone (26) supplying gas to the gas injector (22);
      a return conduit from the mixing chamber back to the primary treatment tank or the polishing tank; and
      a pump (28, 29) for pressurizing the treatment circuit and pumping wastewater from the treatment tank (12, 14) along the inflow conduit, through the mixing chamber (20), along the return conduit and back to the primary treatment tank or polishing tank (12, 14).

2. The wastewater treatment apparatus of claim 1, wherein at least one level indicator (34D, 36D) is provided in each treatment tank for determining a level of wastewater within each treatment tank (12, 14); and
at least one valve (38, 40) is coupled to the at least one level indictor (34D, 36D), the at least one valve (38, 40) opening to transfer wastewater from the at least one treatment tank (12, 14) once a predetermined level of wastewater has been reached.

3. The wastewater treatment apparatus of claim 2, wherein more than one level indicator (34A, 34B, 34C, 34D/36A, 36B, 36C, 36D) is provided for each treatment tank (12, 14).

4. The wastewater treatment apparatus of claim 2, wherein the at least one level indicator (34A, 34B, 34C, 34D/36A, 36B, 36C, 36D) is a float.

5. The wastewater treatment apparatus of claim 1, wherein the pump (28, 29) has an associated grinder (32, 30) for breaking down solids in the wastewater.

6. The wastewater treatment apparatus of claim 1, wherein the mixing chamber (20) mixes gas and liquids through diffusion.

7. The wastewater treatment apparatus of claim 1, further comprising a clarifier treatment tank (60), wherein wastewater is transferred sequentially from the primary treatment tank (12) to the clarifier treatment tank (60) and then to the polishing treatment tank (14).

8. The wastewater treatment apparatus of claim 1, wherein the wastewater is transferred from the polishing treatment tank (14) to a discharge field (42).

9. The wastewater treatment apparatus of claim 1, wherein a holding tank (70) is provided which feeds wastewater to the primary treatment tank (12).

10. The wastewater treatment apparatus of claim 1, wherein at least one timer or electronic controller is provided, and at least one valve (38, 40) is coupled to the at least one timer or electronic controller, wherein the at least one timer or electronic controller opens the at least one valve (38, 40) to transfer wastewater.

11. The wastewater treatment apparatus of claim 1, wherein the source of oxygen is one of a supply of liquid oxygen or an oxygen generator (24), and the source of ozone is an ozone generator (26).

12. The wastewater treatment apparatus of claim 1, wherein the treatment circuit (18) includes an ultra violet treatment chamber (31).

13. The wastewater treatment apparatus of claim 2, wherein the valves (38, 40) are coupled to a first level indicator (34C) and a second level indicator (34D), the valves (38, 40) assuming positions so that operation of the pump (29) associated with the polishing treatment tank (14) transfers wastewater from the polishing treatment tank (14) when a predetermined fluid level is reached within the primary treatment tank (12) as indicated by the first level indicator (34C), and operation of the pump (28) associated with the primary treatment tank (12) transfers wastewater from the primary treatment tank (12) via the transfer conduit (16) to the polishing treatment tank for secondary treatment when a predetermined fluid level is reached within the primary treatment tank (12) as indicated by the second level indicator (34D).

* * * * *

UNITED STATES PATENT AND TRADEMARK OFFICE
CERTIFICATE OF CORRECTION

Page 1 of 1

PATENT NO. : 8,496,808 B2
APPLICATION NO. : 12/531680
DATED : July 30, 2013
INVENTOR(S) : H. Kinasewich et al.

It is certified that error appears in the above-identified patent and that said Letters Patent is hereby corrected as shown below:

In The Claims

| COLUMN | LINE | ERROR |
|---|---|---|
| 5 (Claim 2, | 9 line 6) | "indictor" should read --indicator-- |

Signed and Sealed this
Nineteenth Day of April, 2016

Michelle K. Lee
*Director of the United States Patent and Trademark Office*